United States Patent
Kusaka et al.

[11] Patent Number: 5,322,317
[45] Date of Patent: Jun. 21, 1994

[54] SUSPENSION ARM FOR AUTOMOBILE

[75] Inventors: Kaoru Kusaka; Yasunori Oku; Yasushi Nakazawa, all of Wako, Japan

[73] Assignee: Honda Giken Kogyo Kabushiki Kaisha, Tokyo, Japan

[21] Appl. No.: 987,484

[22] Filed: Dec. 7, 1992

[30] Foreign Application Priority Data

Dec. 11, 1991 [JP] Japan .................. 3-327251

[51] Int. Cl.$^5$ .............................. B60G 7/00
[52] U.S. Cl. .................. 280/673; 280/690; 280/691
[58] Field of Search ........ 280/663, 673, 675, 690, 280/691, 693, 698; 267/228

[56] References Cited
U.S. PATENT DOCUMENTS 4,556,234 12/1985 Mahnig et al. ............ 280/690

FOREIGN PATENT DOCUMENTS

| 2255679 | 11/1972 | Fed. Rep. of Germany | 280/691 |
| 2-144207 | 6/1990 | Japan | 280/691 |
| 3-70607 | 3/1991 | Japan | 280/693 |
| 2174961 | 11/1986 | United Kingdom | 280/691 |

Primary Examiner—Karin L. Tyson
Attorney, Agent, or Firm—Armstrong, Westerman, Hattori, McLeland & Naughton

[57] ABSTRACT

A suspension arm is formed of at least two arm bodies formed by an extrusion. The arm bodies are coupled such that their extruding directions intersect each other. The coupled assembly is integrally provided at one end thereof with a mounting portion for mounting to a wheel and at the other end of the coupled assembly with a mounting portion for mounting to the vehicle body. Thus, a required rigidity and strength can be efficiently provided to portions of the suspension arm to oppose various external forces applied to such portions, while enabling a reduction in weight of the suspension arm.

8 Claims, 8 Drawing Sheets

SUSPENSION ARM FOR AUTOMOBILE

BACKGROUND OF THE INVENTION

1. Field of the Invention

The present invention relates to a suspension arm for suspension of a wheel on an automobile vehicle body.

2. Description of the Related Art

Figure 1:
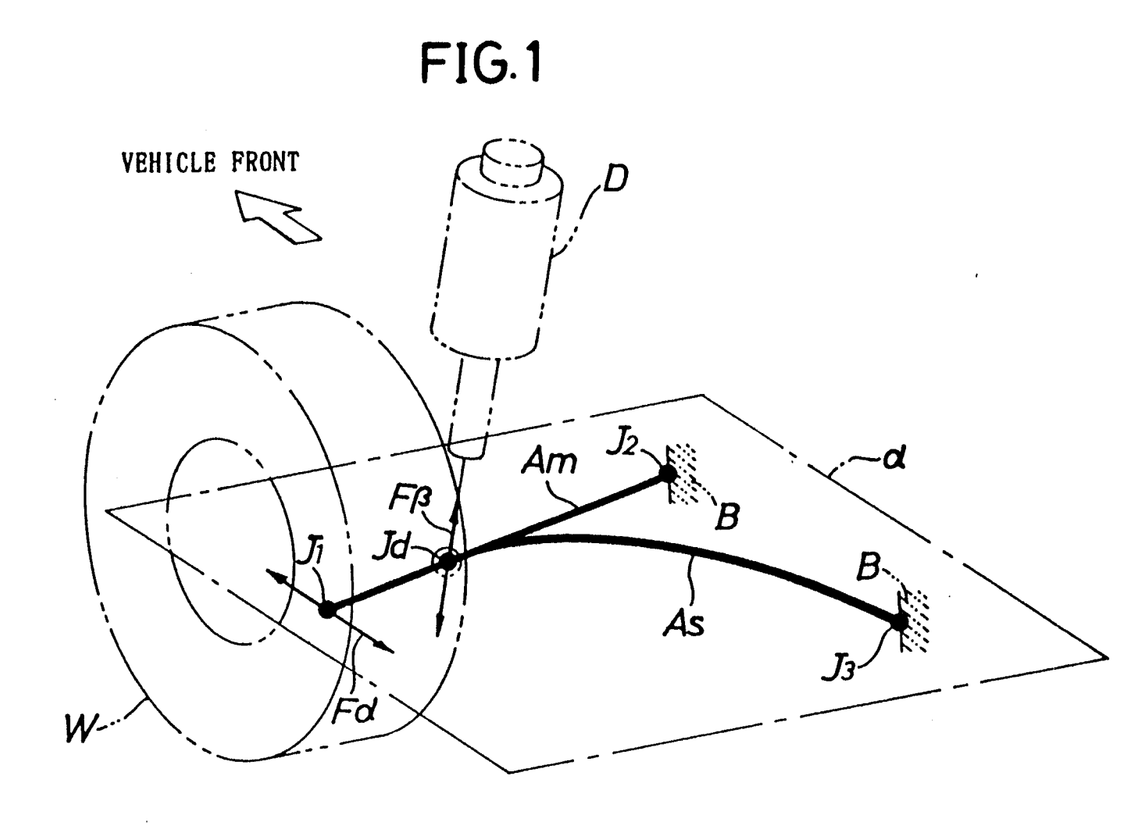
FIG. 1 is a schematic perspective illustration of an arrangement of a suspension arm in an automobile.

A so-called A-shaped suspension arm conventionally, comprises a main arm, including mounting portions integrally formed at opposite ends of an arm body and adapted to be mounted to a wheel and to a vehicle body, respectively, and a subsidiary arm including an arm connecting portion secured to the main arm and a mounting portion mounted to the vehicle body. The arm connecting portion and the mounting portion are integrally formed at opposite ends of an arm body of the subsidiary arm. A damper is mounted to the main arm. Such suspension arm functions to transmit a load from a wheel W to the damper D and the vehicle body B, while being subjected to a first bending force FB applied from the damper D in a direction intersecting a plane $\alpha$ including points of application of the forces (i.e., mounting portions $J_1$, $J_2$, $J_3$, and Jd) and a second bending force F$\alpha$ applied from the wheel W in a longitudinal direction along the plane $\alpha$, as shown in FIG. 1. A forging or pressing technique has been conventionally used in independently forming the main arm and the subsidiary arm.

In this type of the suspension arm, various different external forces, having different directions of application, are applied to the arm portions. However, a suspension arm has not been proposed as yet, which has a structure such that a required rigidity and strength is efficiently provided to various portions of the arm to oppose such various external forces, while at the same time, achieving a reduction in weight of the arm itself.

Figure 10:
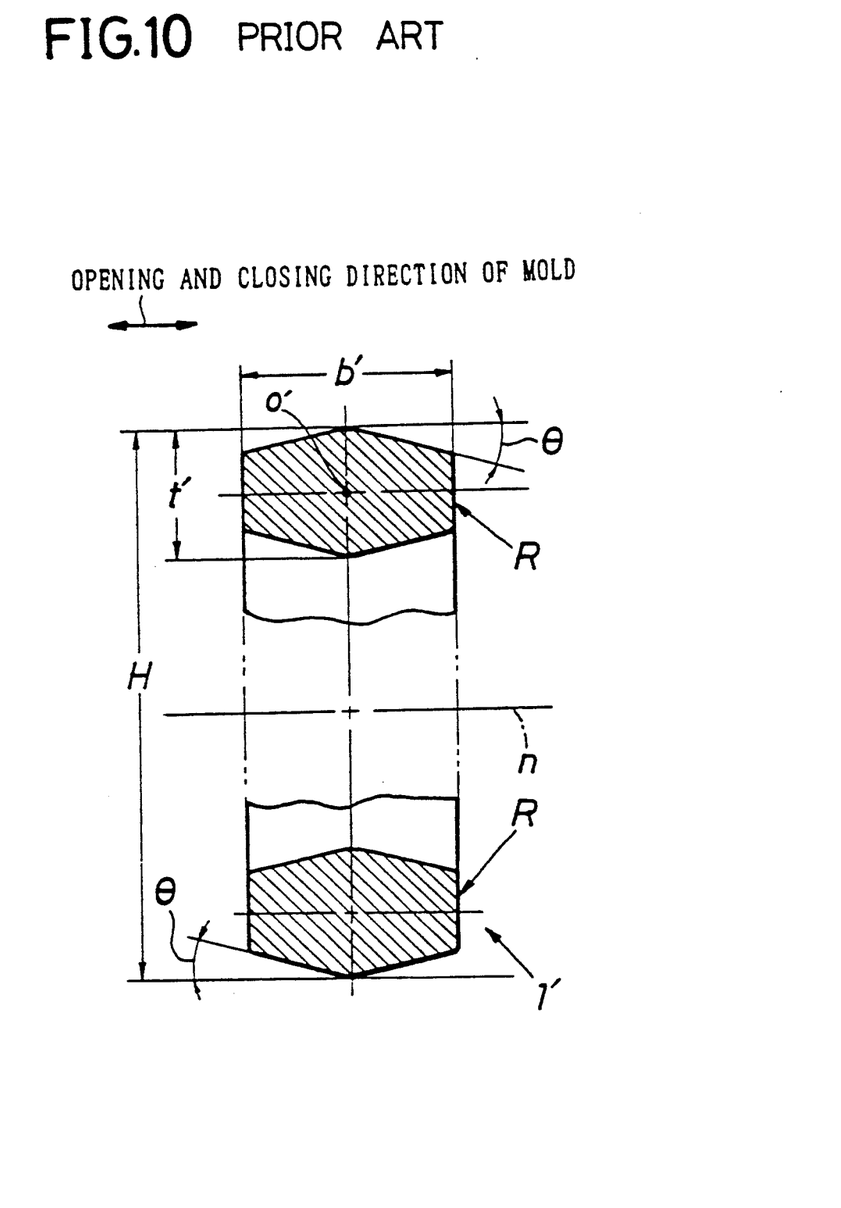
FIG. 10 illustrates a prior art and is a transverse cross sectional view of an arm body formed by forging.

For example, when an arm body, comprised of a rib framework including a plurality of ribs extending in a directions connecting the points of application of forces, is formed by forging, a metal mold is used which is opened and closed in a direction intersecting a plane passing opposite the outer main ribs R, R, of the arm body 1' at right angles in FIG. 10 (i.e., in a lateral direction as viewed in FIG. 10). In order to facilitate the release of a forged product from the mold, a given draft $\theta$ is established in that side of the product which extends in the opening and closing direction.

Thereupon, when the main arm Am having the damper mounting portion Jd, as shown in FIG. 1, is intended to be designed within a given dimension in a vertical direction, because a large force F$\beta$ due to a vertical load from the damper D, is applied to the arm body, as described above, it is necessary to increase the sectional coefficient of the arm body in order to oppose such force. Therefore, for example, sectional centers o' of the main ribs R, R, from a bending-neutral plane n in FIG. 10, are disposed outwardly to the utmost (i.e., at locations vertically spaced from each other). However, the draft $\theta$ is established in the side of each of the ribs R, R, as described, above, and it is difficult to form the rib, itself, while reducing its thickness t'. For this reason, it is impossible to space the sectional center o' of the main rib R sufficiently outwardly apart from the neutral plane n. This is an obstacle to the insurance of a sufficient rigidity and strength required for the arm body 1' to oppose the bending force F$\beta$ with limitations of a predetermined weight (sectional area) and dimension H.

Even with regard to the subsidiary arm As, to which the bending force F$\alpha$ is mainly applied along the plane $\alpha$, the draft $\theta$ provided for forging is an obstacle, for the same reason, to the insurance of a sufficient rigidity and strength required for the subsidiary arm As, itself, or a coupled subsidiary arm/main arm assembly As, Am, to oppose the bending force F$\alpha$ with the limitations of the predetermined weight (sectional area) and dimension.

In addition, it is difficult to form, by forging, a configuration having largely different wall thickness at various portions. Hence, the entire rib thickness is determined in accordance with the thickness of a rib portion requiring a largest strength. Thus, a part of the rib portions are formed thicker than necessary. Therefore, it is difficult to provide a reduction in weight of each arm body.

Further, if a thin plate material, having a relatively large thickness, is produced by pressing and is used in order to provide a large sectional coefficient, a large wrinkle suppressing margin must be specially left. In addition, the material is present in the vicinity of the neutral plane of the arm body and hence, the arm body is not of a reasonable section. Thus, a separate step, such as punching, is required for a reduction in weight, and the working efficiency is inferior.

SUMMARY OF THE INVENTION

Accordingly, it is an object of the present invention to provide a suspension arm for an automobile, wherein a required rigidity and strength can be efficiently provided to arm portions, to oppose various external forces applied to such arm portions, by a combination of two arm bodies, formed by extrusion, by coupling them such that their extruding directions intersect each other, thereby overcoming the above-described problems associated with the prior art suspension arms.

To achieve the above object, according to a first feature of the present invention, there is provided a suspension arm for suspending a wheel on an automobile vehicle body, comprising at least two arm bodies, which have been formed by an extrusion and which are integrally coupled to each other to provide a coupled assembly such that their extruding directions intersect each other, the coupled assembly being integrally provided at one end thereof with a mounting portion to be mounted to the wheel and, at another end, with a mounting portion to be mounted to the vehicle body. In addition, a damper mounting portion may be integrally formed on at least one of the arm bodies. The respective extruding directions for the two arm bodies may intersect each other at right angles in a coupled state. Further, at least one of the mounting portions may be formed by co-extrusion of the arm body connected thereto.

With the above first feature of the present invention, the rigidity and strength required to oppose various external, forces, which act in different directions and in different modes, can be provided to the coupled assembly by properly combining at least two arm bodies formed by the extrusion such that their extruding directions intersect each other. Therefore, the total weight of the suspension arm, as a whole, is reduced within a defined range of dimension, while insuring the required rigidity and strength opposing the various external forces, and contributes to reduction in fuel consumption and improvement in riding comfort.

In addition, according to the second feature of the present invention, there is provided a suspension arm for an automobile, comprising a main arm, comprised of a first mounting portion to be mounted to a wheel and a second mounting portion to be mounted a vehicle body, the first and second mounting portions being integrally coupled to each other through a main arm body, and a subsidiary arm, comprised of an arm connecting portion secured to the main arm and a third mounting portion to be mounted to the vehicle body. The arm connecting portion and the third mounting portion are integrally coupled to each other through a subsidiary arm body. At least a portion of the main arm body, including a plurality of first ribs extending in a direction connecting the first and second mounting portions, leave a clearance between the first ribs. At least a portion of the subsidiary arm body, including a plurality of second ribs extending in a direction connecting the arm connecting portion and the third mounting portion, leave a clearance between the second ribs. The main arm, formed by an extrusion in a direction intersecting a plane extending through the plurality of first ribs and the subsidiary arm, formed by an extrusion in a direction intersecting a plane extending through the plurality of second ribs, are coupled such that their extruding directions are different from each other.

With the above second feature of the present invention, a draft, as required in a forging process, is not provided in a side surface of the rib of each of the main arm and the subsidiary arm. Therefore, under a limitation of a given weight (sectional area) and dimension for each rib, the rib can be formed into a shape elongated to the utmost in the extruding direction for the corresponding arm body, so that the sectional center of such rib can be spaced outwardly apart from a bending-neutral plane of the arm to provide an increased sectional coefficient. Moreover, the thickness of each rib can be set at an optimal value, in accordance with a strength required for the rib, thereby enabling an efficient utilization of material. Consequently, in such suspension arm, a substantial reduction in weight of those portions of the main and subsidiary arm bodies, which include the ribs, can be achieved, while insuring a rigidity and strength required for opposition to the various external forces, and further results in reduction in fuel consumption and improvement in riding comfort in the automobile.

The above, and other objects, features and advantages of the invention, will become apparent from the following description of preferred embodiments, taken in conjunction with the accompanying drawings.

BRIEF DESCRIPTION OF THE DRAWINGS

FIGS. 1 to 7 illustrate a first embodiment of the present invention, wherein

DESCRIPTION OF THE PREFERRED EMBODIMENTS

The structure of a suspension arm A for an automobile according to a first embodiment of the present invention will now be described in connection with FIGS. 1 to 4. The suspension arm A is a so-called L-shaped arm and is used for suspending a front wheel. The suspension arm A comprises a main arm Am having a first mounting portion $J_1$ for pivotal connection to a knuckle arm (not shown) connected to a wheel W, and a second mounting portion $J_2$ for pivotal connection to a bracket (not shown) close to a vehicle body B. The first and second mounting portions $J_1$ and $J_2$ are integrally coupled to each other through a main arm body 1, FIG. 2, as a first arm body. The suspension arm A further includes a subsidiary arm As, which is comprised of a first arm connecting portion $Ja_1$ and a second arm connecting portion $Ja_2$, these portions $Ja_2$ and $Ja_2$ being secured to the main arm Am, and a third mounting portion $J_3$ for pivotal connection to a bracket (not shown) close to the vehicle body B. The first and second arm connecting portions $Ja_1$ and $Ja_2$ are integrally coupled with the third mounting portion $J_3$ through a subsidiary arm body 2 as a second arm body.

The first and second mounting portions $J_1$ and $J_2$ are cylindrically shaped to have first and second mounting holes $h_1$ and $h_2$, respectively, with planes perpendicular to their axes being intersecting each other at right angles. Bushings or bearings for pivotally connecting the first and second mounting portions $J_1$ and $J_2$ to the knuckle and the bracket, respectively, are fitted into the first and second mounting holes $h_1$ and $h_2$, respectively.

The third mounting portion $J_3$ is formed by a pair of opposed sidewalls 3 each having a third mounting hole $h_3$ through which is inserted a bolt for mounting the bush (not shown) for pivotally connecting the bracket close to the vehicle body B to the third mounting portion $J_3$.

Figure 2:
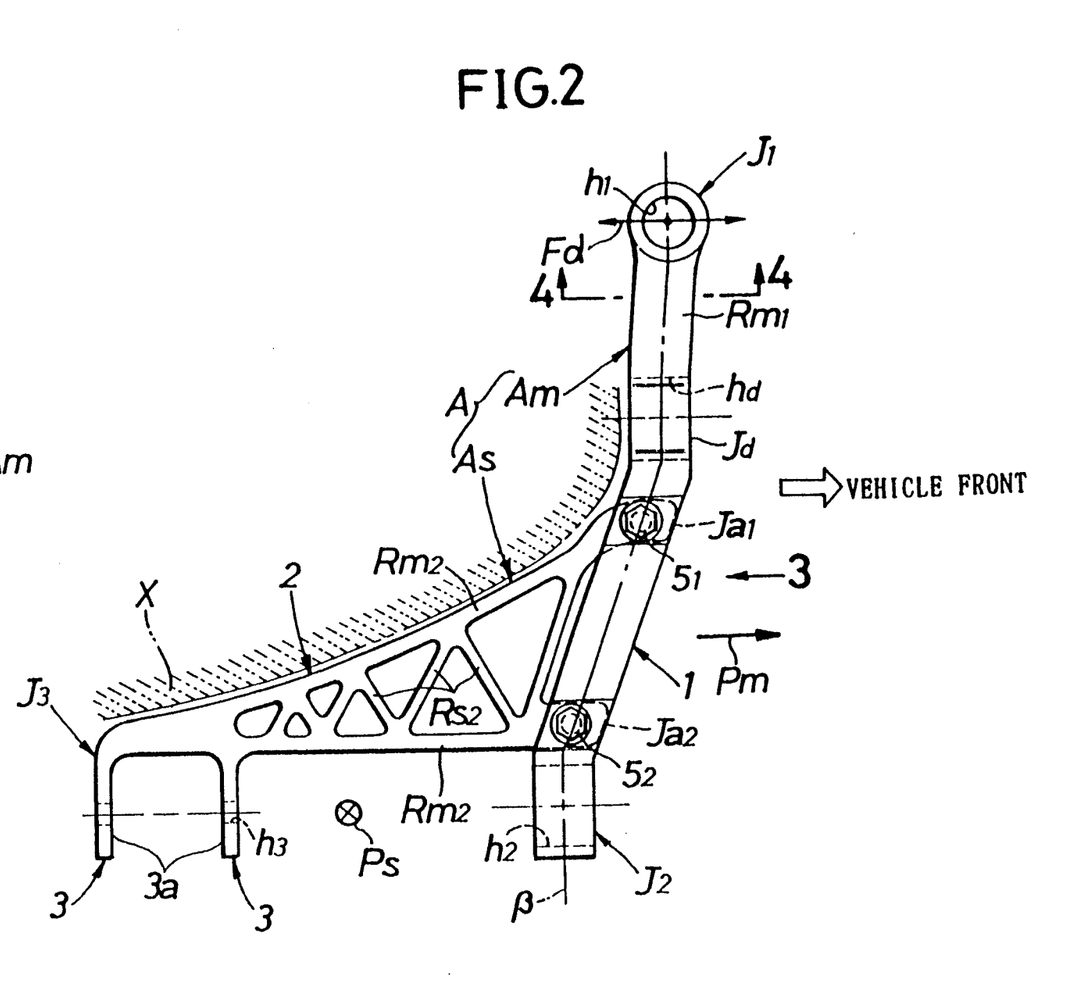
FIG. 2 is a plan view of the suspension arm according to the first embodiment and arranged in the manner shown in FIG. 1.
Figure 3:
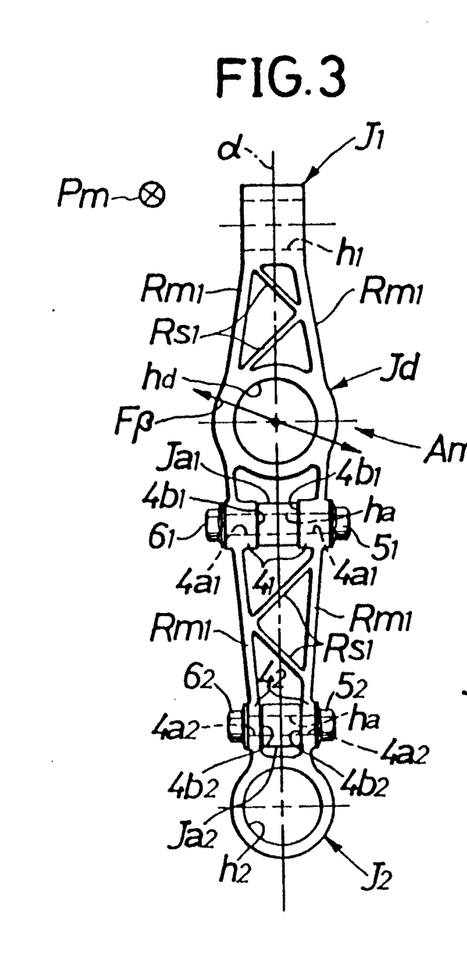
FIG. 3 is a side view taken along an arrow 3 in FIG. 2.

The main arm body 1 is formed of a rib framework, FIG. 3, comprising a pair of upper and lower first main ribs $Rm_1$ which extend in a substantially lateral direction of the vehicle body so as to connect the first and second mounting portions $J_1$ and $J_2$ and which are arranged with a clearance left vertically therebetween, and a plurality of first subsidiary ribs $Rs_1$ which integrally connect both the main ribs $Rm_1$ to each other. Ribs $Rm_1$ and $Rs_1$ are arranged along a bent plane $\beta$, FIG. 2, intersecting (at right angles in the illustrated embodiment) a plane $\alpha$, FIG. 3, extending through the first, second and third mounting portions $J_1$, $J_2$ and $J_3$. The main arm body 1 is integrally provided with a damper mounting portion Jd, at an intermediate portion of the main arm body 1, closer to the first mounting portion $J_1$. As are the first and second mounting portions $J_1$ and $J_2$, the damper mounting portion Jd is also cylindrically shaped to have a damper mounting hole hd. Further, pairs of first and second mounting bosses $4_1$ and $4_2$ are integrally formed on the main ribs $Rm_1$ between the damper mounting portion Jd and the second mounting portion $J_2$. And the first and second arm connecting portions $Ja_2$, and $Ja_2$ of the subsidiary arm as are interposed between the first and second mounting bosses $4_1$ and $4_2$, respectively. The first mounting bosses $4_1$ and the first arm connecting portion $Ja_1$ are co-clamped by a first bolt $5_1$ and nut $6_1$, and the second mounting bosses $4_2$ and the second arm connecting portion $Ja_2$ are co-clamped by a second bolt $5_2$ and nut $6_2$.

The subsidiary arm body 2 is formed of a rib framework comprising a pair of left and right second main ribs $Rm_2$ which extend in a substantially longitudinal direction of the vehicle body to connect the arm connecting portions $Ja_1$ and $Ja_2$ with the third mounting portions $J_3$, respectively, and which are arranged with a clearance left laterally therebetween. The rib framework further comprises a plurality of second subsidiary ribs $Rs_2$ which integrally connect both the main ribs $Rm_2$ to each other. These ribs $Rm_2$ and $Rs_2$ are arranged on the plane $\alpha$. Particularly, the outer second main rib $Rm_2$ is disposed with its outer surface extending along near a limiting region X for the design of shape established for every type of vehicle in order to avoid the interference with the vehicle body or the like.

Figure 5:
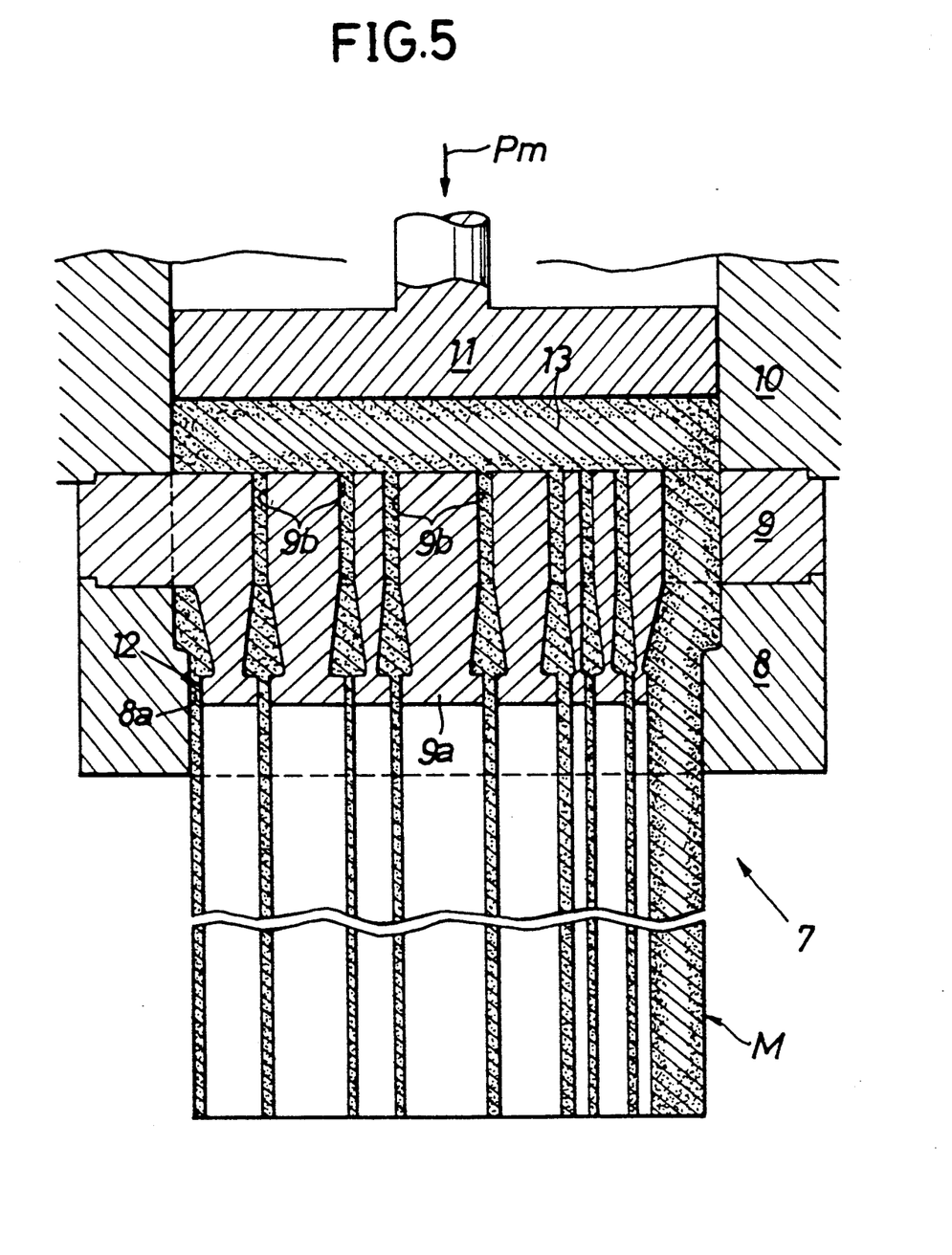
FIG. 5 is a longitudinal sectional view of an essential portion of an extruding apparatus.

A process for producing the main arm Am will now be described with reference to FIGS. 5 and 6. This producing process comprises a first step of forming a main arm blank M by an extrusion (see FIG. 5), a second step of cutting the main arm blank M to provide a plurality of main arms Am (see FIG. 6), and a third step of subjecting a required portion of each of the main arms Am to a machining.

An extruding apparatus 7, used at the first step, comprises a female die 8 having a shaping hole $8a$ for defining the contour of the main arm blank M as an extruded material, a male die 9 having a plurality of projections $9a$ surrounded by the shaping hole $8a$ to define the profile of an inner surface of the blank M, and a container 10 integrally coupled to the dies 8 and 9. A billet urging ram 11 is provided within the container 10. The shaping hole $8a$ and the shaping projections $9a$ cooperate with each other to define die holes 12 which conform with the profile of a projected plane of the main arm Am viewed from the forward of the vehicle body (i.e., the profile shown in FIG. 3). The die holes 12 communicated with an interior of the container 10 through a plurality of billet-passing through-holes $9b$ provided in the male die 9.

A billet 13 of an aluminum simple metal or aluminum alloy preheated into a semi-molten state is placed into the container 10, and the ram 11 is operated. In doing so, a portion of the billet 13 is extruded downwardly through the through-holes $9b$ and the die holes 12, thereby providing a main arm blank M extending long in an extruding direction Pm. The arm blank M is cooled by a cooling device (not shown) disposed adjacent the extruding apparatus 7.

Figure 6:
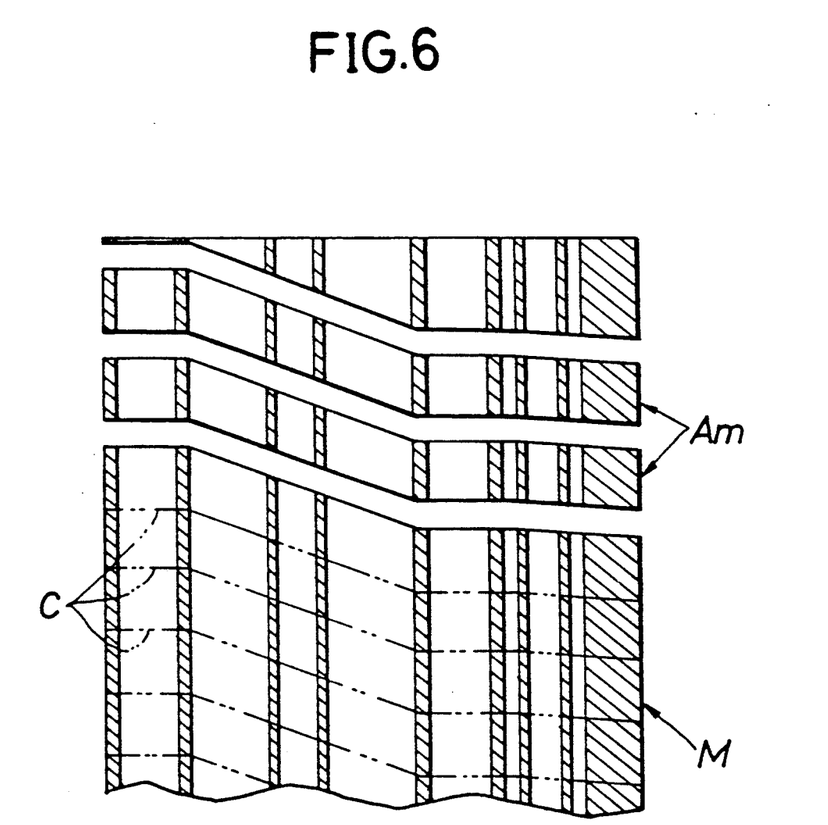
FIG. 6 is a sectional view of an essential portion of arm blanks which are subjected to a cutting step.

The main arm blank M formed in this manner is then cut by a cutter (not shown) at the second step along a plurality of bent cutting planes C, FIG. 6, (corresponding to the bent planes $\beta$) spaced at an equal distance from one another in the extruding direction Pm and intersecting the extruding direction Pm, thereby providing a plurality of main arms Am. Then, the production of each main arm Am is completed by subjecting it to such a post-processing that the mounting hole $h_1$ is cut in the first mounting portion $J_1$ of the main arm Am, and the bolt-insertion holes $4a_1$ and $4a_2$ are cut in the first and second mounting bosses $4_1$ and $4_2$, respectively, and the outer surface of the first mounting portion $J_1$ is cut in accordance with the mounting hole $h_1$.

Thus, the side surfaces of the ribs $Rm_1$ and $Rm_2$; the mounting holes $h_2$ and $h_d$ of the second mounting portion $J_2$ and the damper mounting portion $Jd$; and the abutment surfaces $4b_1$ and $4b_2$ of the mounting bosses $4_1$ and $4_2$ against the connecting portions $Ja_1$ and $Ja_2$ in the main arm Am are formed at given locations with a good accuracy simultaneously with the extruding formation of the main arm Am.

The subsidiary arm As is also formed by an extrusion in a similar procedure, but the extruding direction Ps, FIG. 2, is a vertical direction intersecting (at right angles in the illustrated embodiment) the plane $\alpha$, FIG. 3, extending through the mounting portions $J_1$, $J_2$, $J_3$ and $J_d$, and also intersecting (at right angles in the illustrated embodiment) the extruding direction Pm of the main arm Am. The selection of the extruding direction Ps in this manner ensures that the side surfaces of the ribs $Rm_2$ and $Rm_2$; the bolt-insertion holes $h_a$, in the arm connecting portions $Ja_1$ and $Ja_2$; and the opposed bush abutment surfaces $3a$ of the pair of sidewalls 3 of the third mounting portion $J_3$ in the subsidiary arm As are formed at given locations with a good accuracy simultaneously with the extruding formation of the subsidiary arm As. The post-processing after the extrusion involves perforating the third mounting portion $J_3$ with the mounting hole $h_3$.

In the L-shaped suspension arm A produced in the above manner, the main arm Am is subjected to a large bending force $F\beta$ in a direction intersecting the plane $\alpha$ due to a vertical load applied from the damper D to the damper mounting portion Jd, and the coupled main arm/subsidiary arm assembly Am, As is subjected to a bending force $F\alpha$ along the plane $\alpha$ due to longitudinal load applied from the wheel W along the plane $\alpha$ to the first mounting portion $J_1$.

Figure 4:
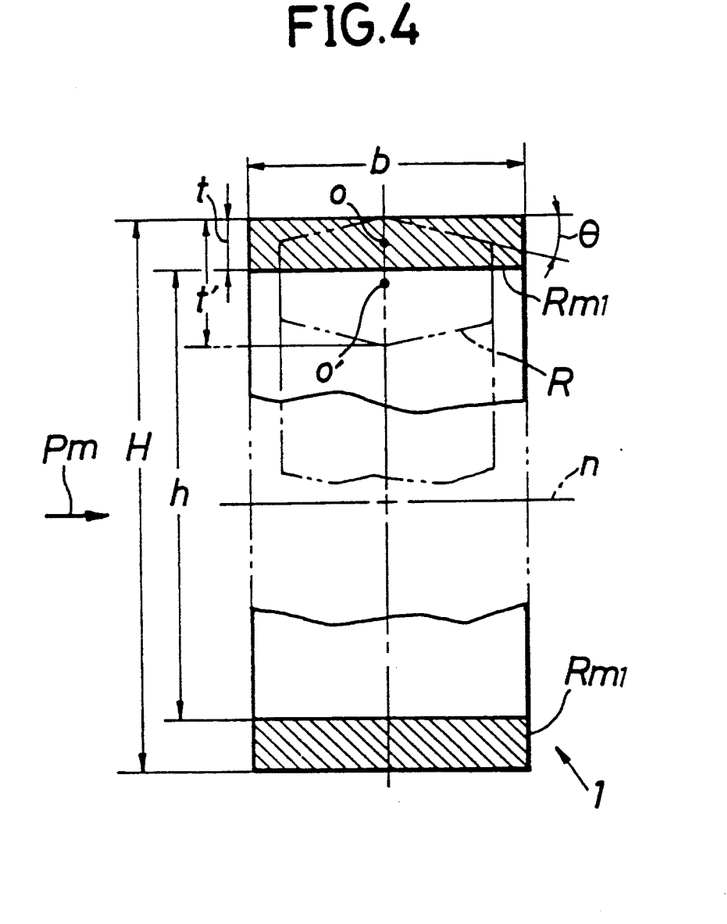
FIG. 4 is an enlarged sectional view taken along an arrow 4 in FIG. 2.

In order to insure a large sectional coefficient of the main arm Am, particularly for the arm A to sufficiently oppose especially the bending force $F\beta$, it is necessary to vertically separate the sectional center o of each of the first main ribs $Rm_1$ from the bending-neutral plane n to the utmost, for example, in FIG. 4. With the extruding formation of the main arm Am, a draft $\theta$ as provided in a rib R (shown by a dashed line in FIG. 4 and by a solid line in FIG. 10) required in forging is not defined in a side surface of each of the main ribs $Rm_1$ in the extruding direction Pm. Therefore, it is possible to form each main rib $Rm_1$ into a shape longitudinally elongated to the utmost (i.e., it is possible to make a longitudinal width b long and a vertical thickness t small) with such limitations that the sectional area b (H-h) and the vertical dimension H of the main ribs $Rm_1$ are required to be made constant. In other words, because the sectional center o of each main rib $Rm_1$ can vertically be separated far from the neutral plane n, the sectional coefficient of the arm body 1 can be increased, thereby providing a reduction in weight of the body 1 while insuring a rigidity and a strength required for the arm body 1. Therefore, as compared with the rib formed by forging, the section coefficient of the arm body 1 can be increased without increasing the sectional area and vertical dimension of the main ribs $Rm_1$, thereby increasing the rigidity and strength thereof. In addition, particularly in the illustrated embodiment, the clearance between the main ribs $Rm_1$ is widened around the damper mounting portion Jd which bear a large load and is reduced toward the first and second mounting portions $J_1$ and $J_2$, as shown in FIG. 3, thereby providing a further reduction in weight, while insuring the strength and rigidity and the layout.

On the other hand, in order to insure a large sectional coefficient of the subsidiary arm As so that the subsidiary arm As can sufficiently oppose the bending force $F\alpha$, it is required to locate the outer second main rib $Rm_2$ as close as possible to the limiting region X for the design of shape from the bending-neutral plane, and to properly dispose the subsidiary ribs $Rs_2$ for the purpose of preventing the buckling of the main ribs $Rm_2$. These requirements can be achieved without difficulty by forming the subsidiary arm As by the extrusion in the above-described manner. Therefore, it is possible to provide a reduction in weight of the subsidiary arm As while insuring a rigidity and strength required for the subsidiary arm As. Thus, the entire suspension arm A which is a coupled assembly of the main and subsidiary arms Am, As is of a reasonable configuration having a high rigidity and strength and a reduced weight.

Figure 7:
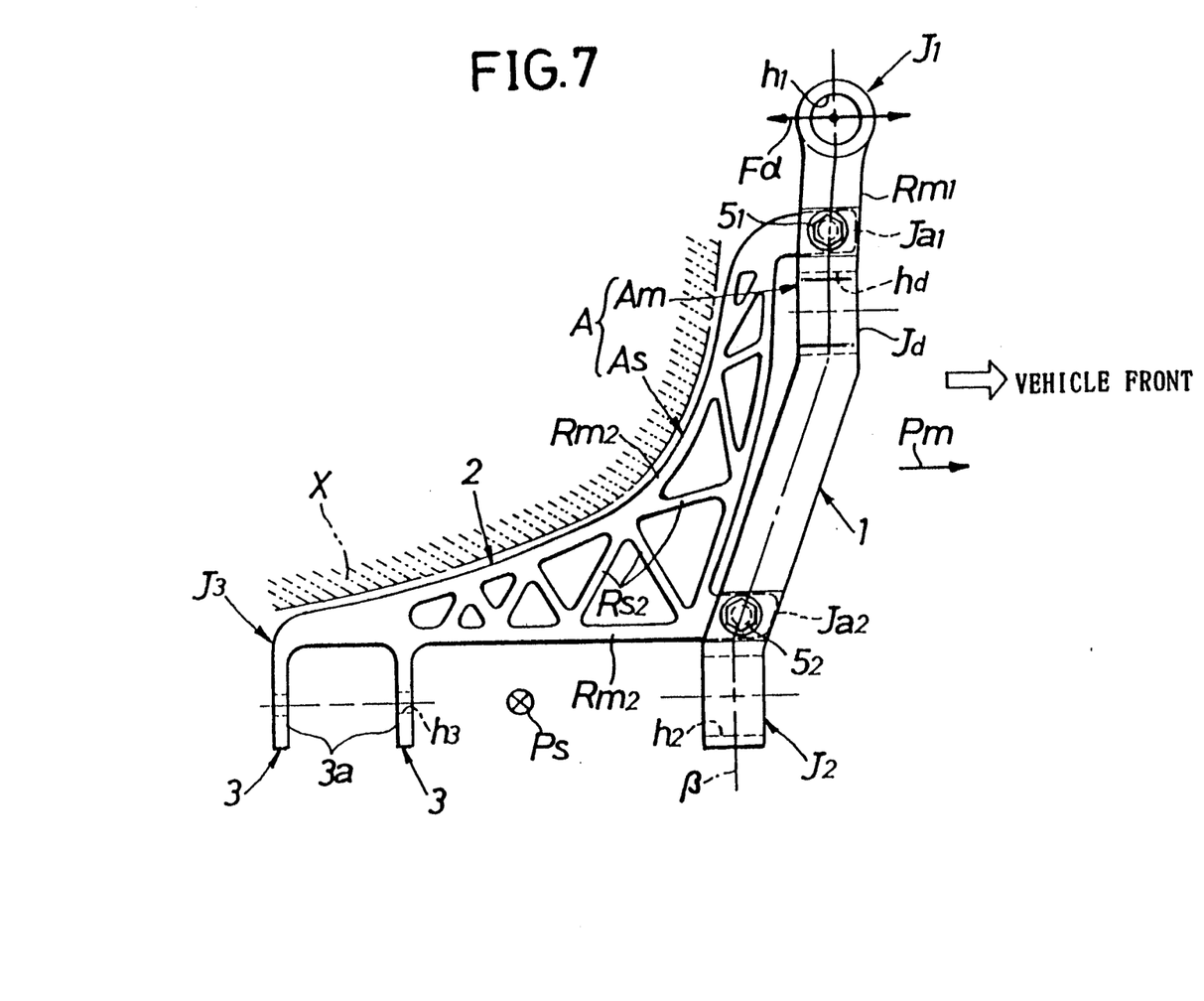
FIG. 7 is a plan view of a modification of the first embodiment.

It should be noted that as shown in FIG. 7, the first arm connecting portion $Ja_1$ can be disposed outside closer to the wheel of the damper mounting portion Jd by extending a portion of the subsidiary arm body 2 adjacent the first arm connecting portion $Ja_1$ laterally outwardly of the vehicle, depending upon the extent of the limiting region X in design shape.

Figure 8:
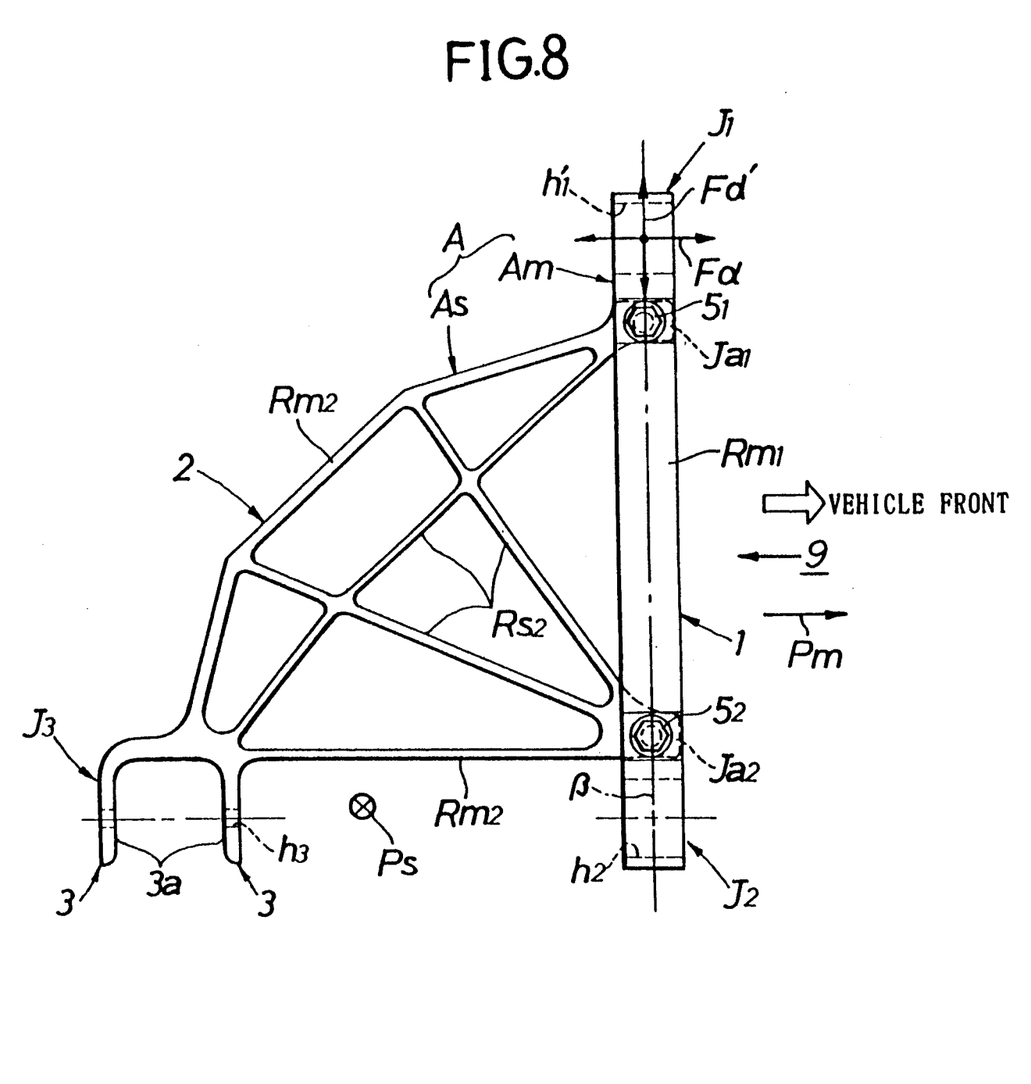
FIG. 8 is a plan view of a second embodiment of the present invention.
Figure 9:
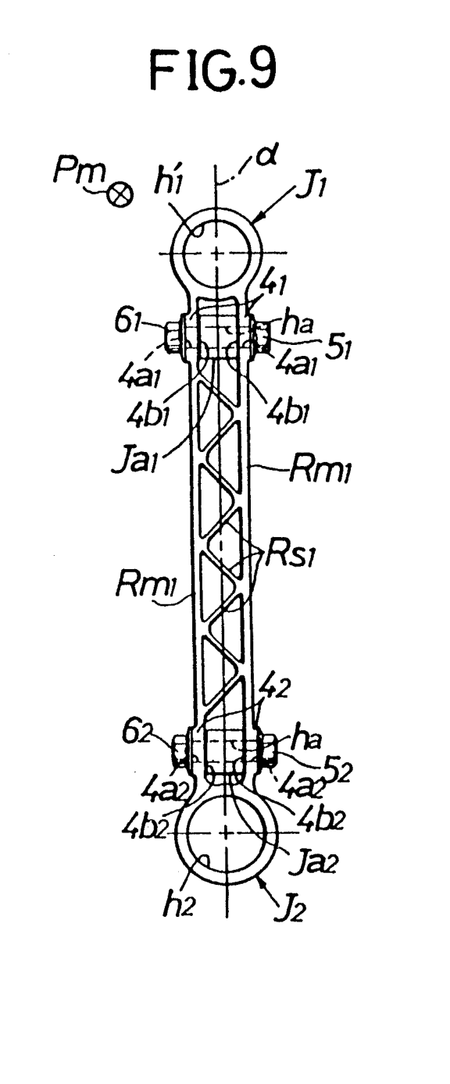
FIG. 9 is a sectional view taken along an arrow 9 in FIG. 8.

The structure of a suspension arm A according to a second embodiment of the present invention will now be described with reference to FIGS. 8 and 9. The suspension arm A is a so-called A-shaped arm and is used for suspending a rear wheel. The suspension arm A includes a main arm Am formed into a rectilinear shape, with no damper mounting portion provided at an intermediate portion thereof. In the suspension for the rear wheels, the limiting region X for the design of shape is relatively small and hence, the outer main rib $Rm_2$, in the subsidiary arm body 2 of the subsidiary arm As largely projects outwardly into an arched shape. The main arm Am and the subsidiary arm As, in this embodiment, are also formed by an extrusion from two different directions (intersecting each other in the assembled state of the illustrated embodiment) in the same manner as in the previously described embodiment. In the suspension arm A of this embodiment, a mounting hole $h_1$ in a first mounting portion $J_1$ is turned to an extruding direction Pm for the main arm Am, unlike the corresponding mounting hole in the previous embodiment, and therefore, the mounting hole $h_1$ can be also formed at a given location with a good accuracy simultaneously with the extruding formation of the arm Am.

In such a rear A-shaped suspension arm A, the bending force $F\alpha$ closing in the direction intersecting the plane $\alpha$ extending through the first, second and third mounting portions $J_1$, $J_2$ and $J_3$ is small, but the bending force $F\alpha$ due to the longitudinal load applied from the wheel W along the plane $\alpha$ is dominant. In addition to these forces, the A-shaped suspension arm A is subjected to a compressive/tensile force $F\alpha'$ due to a lateral load applied from the wheel W along the plane $\alpha$. However, the A-shaped suspension arm A can sufficiently oppose the former bending force $F\alpha$, because the outer main rib $Rm_2$ of the subsidiary arm As and the rectilinear main arm Am are sufficiently spaced from the bending-neutral plane and a large sectional coefficient is insured thereby. In addition, the A-shaped suspension arm A can sufficiently oppose the force $F\alpha'$ (particularly, the compressive force), because the large clearance between the upper and lower main ribs $Rm_1$, in the main arm Am, can be provided by the extrusion, so that the sectional secondary moment I can be set at a large level to increase the critical compressive force, i.e., $\pi^2 EI/s^2$ (wherein E is Young's modulus of material and s is a main arm supporting span).

Although the two arm bodies, i.e., the main arm body 1, and the subsidiary arm body 2 have been described as the plurality of arm bodies in the above-described embodiments, it will be understood that according to the present invention, three or more arm bodies may be used in combination. In addition, although the bolt and nut has been used as the means for coupling the arm bodies in the above-described embodiment, it will also be understood that the coupling means is not limited thereto, and the arm bodies may be inseparably coupled with each other, for example, by welding.

Further, although each of the arm bodies 1 and 2 has been described as being formed of the rib framework comprising the plurality of ribs integrally coupled with one another in the above-described embodiments, it will be understood that according to the present invention, at least one of the arm bodies may be entirely formed of a solid metal, or a longitudinal portion of at least one of the arm bodies may be formed of a rib framework, and the remaining portion may be formed of a solid metal.

Yet, further, although the extruding directions Pm and Ps for the main arm body 1 and the subsidiary arm body 2 have been defined to intersect each other at right angles, in carrying out the extrusion in the illustrated embodiments, it will be understood that according to the present invention, the extruding directions Pm and Ps for the main arm body 1 and the subsidiary arm body 2 may be oblique to each other. Although the cutting plane C, used to cut the arm blank M to provide the plurality of suspension arms A, FIG. 6, has been described as being the straight plane or the bent plane, in the illustrated embodiments, it will be also understood that the cutting plane may be curved.

What is claimed is:

1. A suspension arm for an automobile for suspending a wheel on a vehicle body, comprising:
   at least first and second arm bodies said first arm body having been formed by extruding in a first direction, said second arm body having been formed by extruding in a second direction, said first and second arm bodies being integrally coupled to each other to provide a coupled assembly such that said first direction and said second direction intersect each other in a coupled state of these arm bodies, wherein at least one of said first and second arm bodies includes a plurality of individual ribs, said coupled assembly being integrally provided at one end thereof with a mounting portion for mounting to said wheel and at the other end with a mounting portion for mounting to said vehicle body.

2. A suspension arm for an automobile according to claim 1, wherein at least one of said first and second arm bodies includes a damper mounting portion integrally formed thereon.

3. A suspension arm for an automobile according to claim 1, wherein said respective extruding process directions for said first and second arm bodies intersect at a right angle.

4. A suspension arm for an automobile according to claim 1 or 2, wherein at least one of said mounting portions is formed by a co-extrusion process together with one of said arm bodies connected thereto.

5. A suspension arm for an automobile according to claim 3 wherein at least one of said mounting portions is formed by a co-extrusion process together with one of said arm bodies connected thereto.

6. A suspension arm for an automobile, comprising;
a main arm comprised of a first mounting portion for mounting to a wheel and a second mounting portion for mounting to a vehicle body, said first and second mounting portions being integrally coupled to each other through a main arm body; and
a subsidiary arm comprised of an arm connecting portion secured to said main arm and a third mounting portion for mounting to said vehicle body, said arm connecting portion and said third mounting portion being integrally coupled to each other through a subsidiary arm body, at least a portion of said main arm body including a plurality of first ribs extending in a direction connecting said first and second mounting portions and leaving a clearance between said first ribs, at least a portion of said subsidiary arm body including a plurality of second ribs extending in a direction connecting said arm connecting portion and said third mounting portion and leaving a clearance between said second ribs, said main arm being formed by an extrusion process in a direction intersecting a plane extending through the plurality of first ribs, and said subsidiary arm being formed by an extrusion process in a direction intersecting a plane extending through the plurality of second ribs in a direction different from the extruding process direction of said main arm.

7. A suspension arm for an automobile according to claim 1, wherein the mounting portions of the coupled assembly to the wheel and the vehicle body are laid in a plane and the direction of the extrusion process for one of said first and second arm bodies crosses said plane while the direction of the extrusion process for the other of said first and second arm bodies is substantially along said plane.

8. A suspension arm for an automobile according to claim 7, wherein the direction of the extrusion process for said one arm body is substantially vertical while the direction of the extrusion process for the other arm body is substantially longitudinal of the vehicle body.

* * * * *